United States Patent
Peters et al.

(10) Patent No.: US 6,564,319 B1
(45) Date of Patent: *May 13, 2003

(54) TECHNIQUE FOR COMPRESSING DIGITAL CERTIFICATES FOR USE IN SMART CARDS

(75) Inventors: Mark E. Peters, Chapel Hill, NC (US); Parley Avery Salmon, Raleigh, NC (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 116 days.

(21) Appl. No.: 08/998,971

(22) Filed: Dec. 29, 1997

(51) Int. Cl.$^7$ .............................. H04L 9/00; H04K 1/00; G06F 15/00; G06K 9/54
(52) U.S. Cl. .................... 713/156; 713/185; 707/511; 707/512; 382/305
(58) Field of Search ................ 705/41, 26; 380/30, 380/269; 358/452; 713/156–157, 159; 707/101, 511, 530, 531, 512; 382/305, 236; 704/10

(56) References Cited

U.S. PATENT DOCUMENTS

| | | | |
|---|---|---|---|
| 5,182,656 A | * | 1/1993 | Chevion et al. ............. 358/452 |
| 5,434,919 A | * | 7/1995 | Chaum ..................... 380/30 |
| 5,438,661 A | * | 8/1995 | Opgawa ..................... 345/804 |
| 5,497,422 A | * | 3/1996 | Tysen et al. ............... 713/157 |
| 5,499,180 A | * | 3/1996 | Ammirato et al. ........... 707/503 |
| 5,689,671 A | * | 11/1997 | Stromberg ................... 704/10 |
| 5,712,914 A | * | 1/1998 | Aucsmith et al. ............. 380/30 |
| 5,806,078 A | * | 9/1998 | Hug et al. .................. 707/203 |
| 5,999,936 A | * | 12/1999 | Pattison et al. ............. 707/101 |
| 6,119,120 A | * | 9/2000 | Miller ....................... 707/101 |

OTHER PUBLICATIONS

"Euromax: a radical approach to serving the newspaper market." Seybold Report on Publishing Systems. v25, n15, p7(14). Apr. 29, 1996.*

Papazoglou, M. "Unraveling the semantics of conceptual Schemas." Communications of the ACM. v38, n9, p80(15). Sep. 1995.*

"Final Text of Draft Amendments DAM 4 to ISO/IEC 9594–2, DAM 2 to ISO/IEC 9594–6, DAM 1 to ISO/IEC 9594–7, and DAM 1 to ISO/IEC 9594–8 on Certificate Extensions," ISO/IEC JTC 1/SC 21/WG 4 and ITU–T Q15/7 Collab. Editing Meeting on the Directory. Jun. 30, 1996.*

"A Public Key Infrastructure for U.S. Government Unclassified but Sensitive Applications." Warwick Ford. Sep. 1, 1995.*

* cited by examiner

*Primary Examiner*—Gail Hayes
*Assistant Examiner*—Anthony DiLorenzo
(74) *Attorney, Agent, or Firm*—Gregory M. Doudnikoff

(57) ABSTRACT

A technique for compressing certificate information for use in portable credit instruments having limited storage capacity. An end user certificate typically actually comprises a chain of certificates, as SET transactions require not only the end user certificate and its parent certificates. Each certificate in the certificate chain is compared to a template for that certificate, and the differences are stored. Redundant differences within each certificate are deleted, as are differences which may be derived from differences stored for other certificates in the certificate chain. The remaining stored differences are then recorded on an end user credit instrument, such as a smart card. Preferably, the certificate chain is then recreated for verification purposes before the card is issued. PER encoding may also be employed to further compress the certificate information to be recorded on the credit instrument.

10 Claims, 6 Drawing Sheets

TECHNIQUE FOR COMPRESSING DIGITAL CERTIFICATES FOR USE IN SMART CARDS

BACKGROUND OF THE INVENTION

1. Field of the Invention

The present invention relates to a technique for compressing digital certificates. More particularly, the present invention relates to a technique for compressing digital certificates used in secure electronic transactions (SET) so that their memory requirements are minimized to permit more data, such as multiple certificates, to be stored on credit instruments having memory limitations, such as smart cards.

2. Description of the Related Art

A major drawback to the acceptance of electronic commerce has been public concerns over security on the Internet. Highly publicized instances of electronic eavesdropping, hackers breaking into military computers, etc., have reduced the public's trust in the Internet as a safe way to conduct business. Unless the public is convinced that it is safe to use their credit cards, debit cards or checks (in electronic form) to make transactions over the Internet, the Internet will not become a viable commercial vehicle.

To this end, a number of companies have been developing a highly secure set of protocols to gain the public's trust for electronic commerce. One of these protocols, known as SET (secure electronic transactions), combines encryption technology and digital signatures, provides for instant verification for merchants, and minimizes the amount of personal information (in the form of credit card numbers, etc.), that is exposed to parties involved in a SET transaction, including merchants.

SET relies on the use of digital certificates to authenticate the digital signature of the holder of an electronic/digital credit instrument with regard to a payment instruction. For the purpose of electronic commerce, a bank issues to its customers electronic/digital versions of credit instruments such as credit cards, debit cards, checks, etc. Data in the electronic credit instrument (known as a certificate), such as a credit card number, expiration date, etc., is encrypted or otherwise masked. The certificate also includes the customer's/consumer's digital signature key. When a consumer makes a purchase from a merchant over the Internet using a certificate which represents a credit card, the certificate is transmitted to the merchant, which transmits the certificate to the appropriate bank based on data contained in the certificate. The merchant never sees the data contained in the digital signature, and only has access to limited information contained in the certificate. However, the merchant can be relatively secure in the belief that the buyer is very likely the actual account holder for the credit instrument (brand) utilized to make the purchase, and that the buyer did in fact "sign" the payment instruction. Public key encryption permits the information to be communicated with minimal fear that electronic eavesdroppers can decrypt the data contained in the data transfer over the Internet. The bank approves the transaction by verifying the digital signature, determining that the account is active and in good standing, that sufficient funds are in the consumer's account/the consumer has not gone over his credit limit, etc., and sending the merchant an indication of the approval. The merchant is credited by the bank in the amount of the transaction, and the bank debits the consumer's account.

In the United States in 1997, most consumers are involved in a form of electronic commerce every day through the use of their credit cards, debit cards, check cards and ATM cards. These cards utilize a magnetic strip to store consumer account data. However, this magnetic strip can contain only a minimal amount of data (on the order of 100 bytes) which can easily be copied onto a fraudulent card. While 100 bytes is enough to store basic account information such as an account number, an account name, an expiration date, etc., for one or two accounts, magnetic strip cards do not provide sufficient storage to store information for multiple accounts, much less an encrypted digital certificate. While magnetic strip cards are relatively inexpensive, costing less than a dollar each, they have no ability to perform processing or interact with the merchant or card holder in any other way, or provide storage for any other purpose.

In other parts of the world, especially Europe, smart cards have gained wide acceptance. Smart cards have several times the storage capacity of common American magnetic strip cards, and often have logic built in which makes the smart cards extremely difficult to compromise without detection by the card holder. Smart cards are protected by PINs (personal identification numbers), so account information cannot be divulged without the cooperation of the cardholder. More sophisticated smart cards contain a secret symmetric key which can be used to sign a payment instruction upon PIN entry. Only the bank knows the actual secret key on the smart card, and it can verify that the cardholder agreed to a given payment instruction. The strength of this scheme is that the account number is never divulged to a merchant, and thus, cannot be replayed for fraudulent purposes. However, smart cards are several times the cost of a common American credit card, several dollars versus less than a dollar.

The most sophisticated smart cards, called "multifunction cards," can be programmed for many onboard applications, including public key signatures. One of the requirements of SET is that when a cardholder submits a payment instruction to a merchant, the cardholder implementation must provide its own certificate. In addition to its own certificate, the cardholder implementation must provide the certificate of the certificate authority which signed the cardholder certificate, called the certificate issuer. Furthermore, every issuer up to and including the SET Root Certificate must be included. Collectively, these certificates are referred to as the certificate chain. These smart cards are several times the cost of a common smart card, currently about $10–$25 dollars versus several dollars, and still lack enough storage to hold more than one consumer certificate and all of the certificates in the hierarchical certificate chain.

Given the growing popularity of SET, the limited storage space available on magnetic strip cards, and the proven effectiveness of smart cards, it makes sense to use SET in combination with smart cards. But given the cost of smart cards, an effective way is needed to store more than one credit instrument/SET certificate on a single smart card. Accordingly, a need has developed for a technique for storing multiple certificates on a single smart card or any credit instrument for which storage is limited.

SUMMARY OF THE INVENTION

An object of the present invention is to provide a technique for storing more than one certificate on a conventional smart card.

Another object of the present invention is to provide a technique for storing multiple certificate-based credit instruments in a single smart card.

Yet another object of the invention is to provide a technique for providing enhanced security for smart card transactions.

Still another object of the present invention is to enable the same type of secure transactions for both Internet-based transactions and card-based transactions.

Other objects and advantages of the present invention will be set forth in part in the description and the drawings which follow, and, in part, will be obvious from the description or may be learned by practice of the invention.

To achieve the foregoing objects, and in accordance with the purpose of the invention as broadly described herein, the present invention provides a software implemented process for use in a computing environment for compressing certificate data from a certificate chain, comprising first subprocesses for selecting a first certificate in the certificate chain for processing; second subprocesses for determining a certificate template which corresponds to the selected certificate; third subprocesses for determining and storing the differences between the selected certificate and the template; fourth subprocesses for repeating the first, second and third subprocesses for the remaining certificates in the certificate chain; and fifth subprocesses for storing the differences in an end user credit instrument. Preferably, the end user credit instrument is a smart card. Further, the process may further comprise sixth subprocesses, carried out after the third subprocesses, for deleting differences which can be derived from other stored differences. Additionally, the process may further comprise seventh subprocesses for recreating the certificate chain and comparing the recreated certificate chain to the original certificate chain, and if any differences are found, indicating an error. The process may further comprise eighth subprocesses, carried out for each certificate after the third subprocesses, for determining whether any of the differences for the certificate being processed can be derived from other stored differences, and if so, deleting the differences; and ninth subprocesses, carried out for each certificate after said eighth subprocesses, for deleting differences which can be derived from differences already stored for other certificates in the certificate chain.

The present invention also provides a system for compressing certificate data for reducing storage requirements for a certificate chain, comprising means for determining differences between each certificate in the certificate chain and a corresponding certificate template; means for storing the differences; means, relative to each certificate, for determining which differences may be derived from other differences stored for each certificate and deleting the differences determined to be derivable; and means for storing the remaining differences on a credit instrument. The system further comprises means for employing PER encoding when storing the remaining differences on the credit instrument.

Additionally, the present invention provides a method for compressing a digital certificate comprising a certificate chain and storing the compressed certificate chain on a credit instrument, comprising the steps of determining differences between each individual certificate in the certificate chain and a base certificate for each of the individual certificates; storing the differences; for each of the individual certificates, determining which differences are redundant and deleting the redundant differences; and recording remaining differences on a credit instrument. The method may further comprise the step of, after said determining step, deleting other differences which may be derived from differences stored for other certificates.

Additionally, the present invention provides an end user credit instrument having a compressed certificate chain stored therein.

The present invention will now be described with reference to the following drawings, in which like reference numbers denote the same element throughout.

DESCRIPTION OF THE PREFERRED EMBODIMENT

Figure 1:
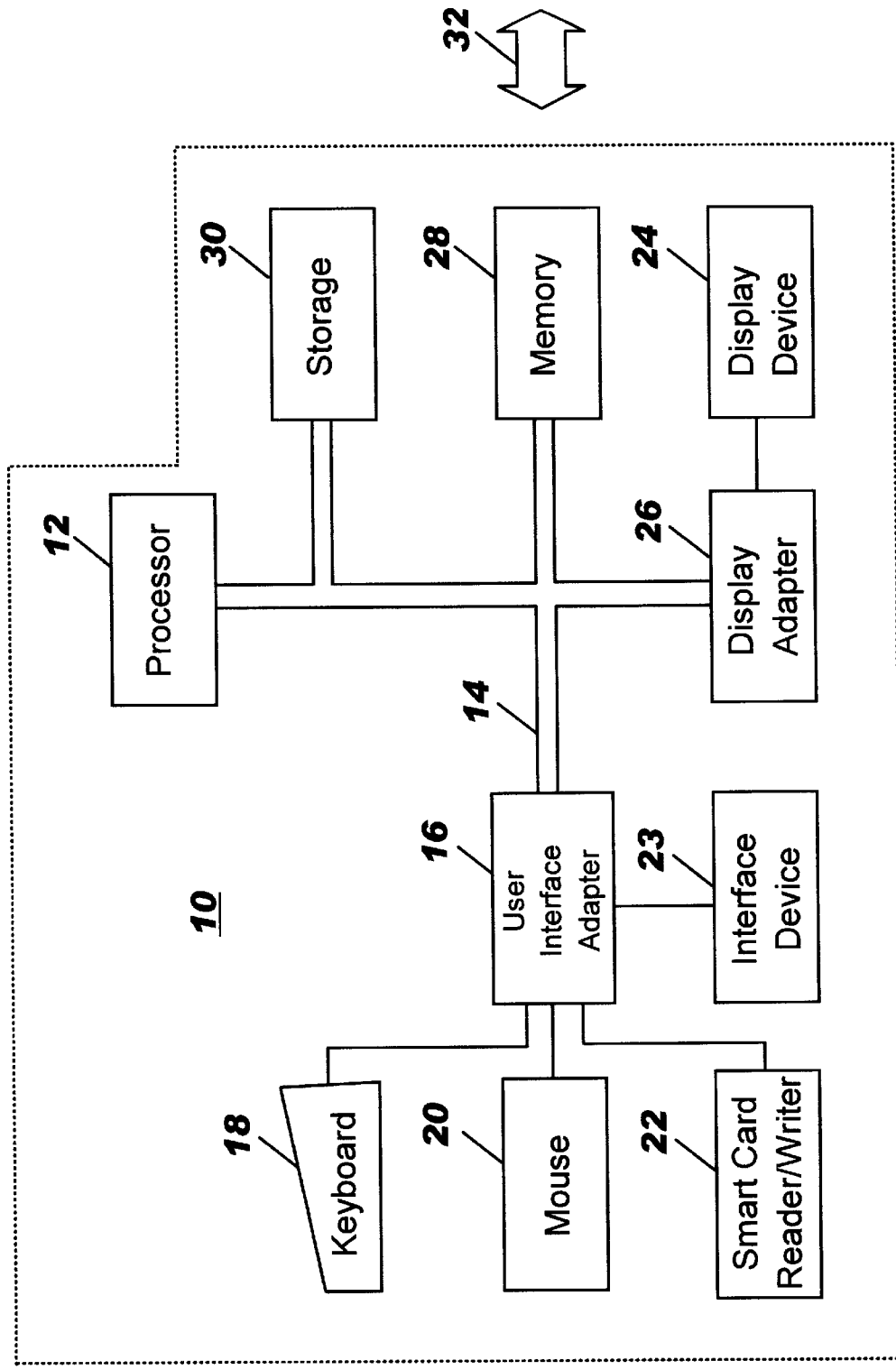
FIG. 1 is a block diagram of a computer-based smart card encoding system in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20. The workstation 10 may also have a smart card reader/writer 22 associated therewith, which is able to encode smart cards and read information from smart cards. Other interface devices, such as interface device 23, which can be any user interface device, such as a touch sensitive screen, a digitized entry pad, etc., may also be associated with the workstation 10. The bus 14 also connects a display device 24, such as an LCD screen or monitor, to the microprocessor 12 via a display adaptor 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer (such as a mainframe computer), etc. All of these configurations, as well as the appropriate communications hardware and software, are known in the art. Using the communications channel 32, certificate information may be provided to the workstation 10 from a mainframe computer or central database which processes or distributes certificate information that is to be encoded on smart cards. Other known computer system configurations may also be employed to implement the subject invention.

The specific technology employed for writing to or reading data from smart cards is well known, and will not be further discussed herein.

Software programming code which embodies the compression technique according to present invention is typically accessed by the microprocessor 12 of the workstation 10 from long term storage media of some type, such as a CD-ROM drive or hard drive, which is represented by the long term storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Figure 2:
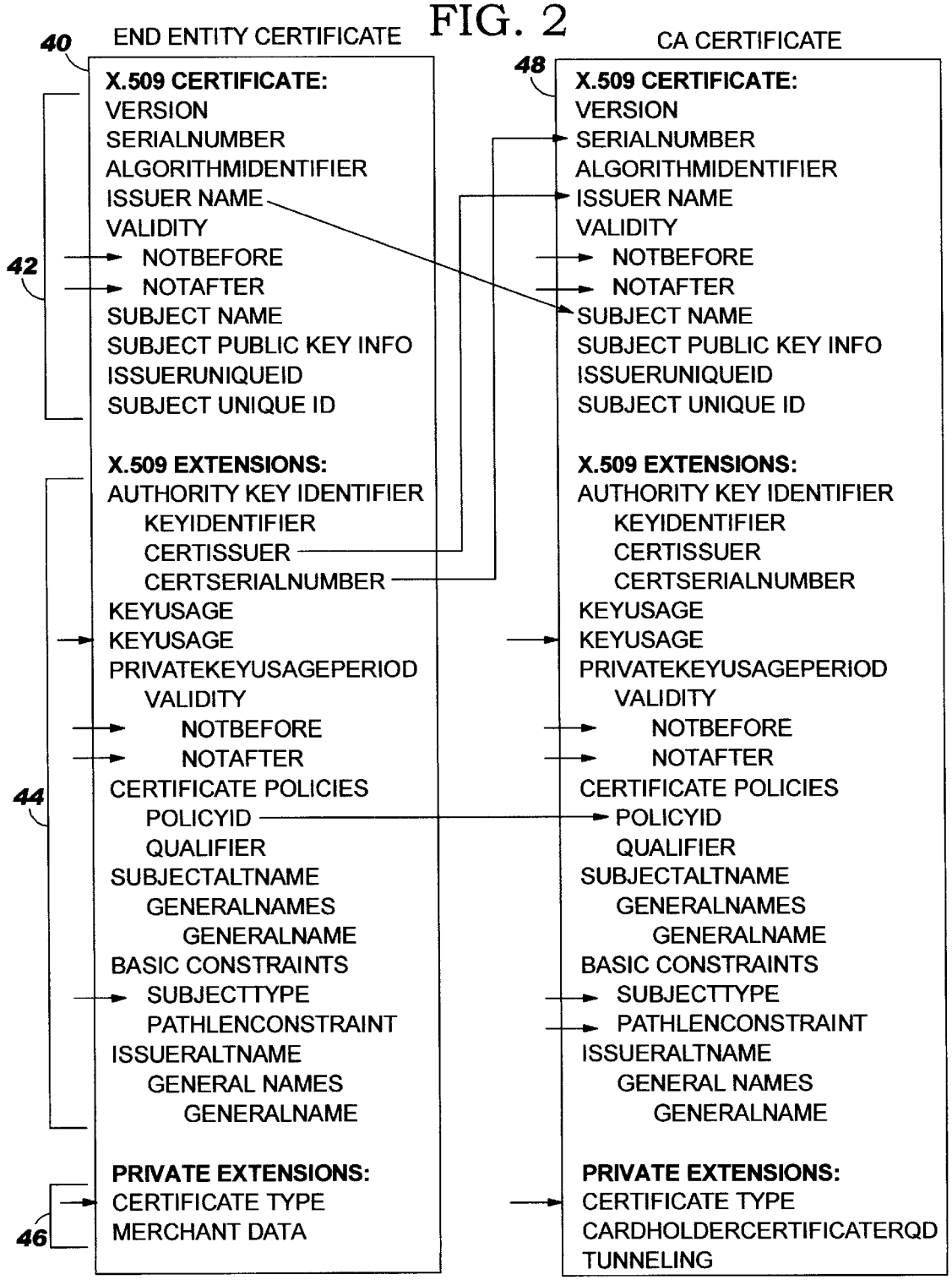
FIG. 2 illustrates examples of SET certificate templates.

One aspect of secure electronic transaction (SET) protocol is the reliance on the exchange of certificates during a transaction. SET certificates are based on the X.509 standard. FIG. 2 illustrates the types of data included in a standard SET certificate 40 issued to an end entity, such as a credit cardholder, a merchant, or a payment gateway. The certificate 40 includes required or standard X.509 certificate data 42, such as version information, a serial number, the name of the issuer of the certificate (the issuing bank in the case of a credit card), the period during which the certificate is valid, the issuer ID, a subject ID, etc. The certificate 40 also includes a number of defined X.509 extensions 44, such as certificate policy information, key usage information, key identifier information, alternate names, etc. The certificate 40 also includes a number of SET-specific (private) extensions 46, such as certificate type information and merchant data. FIG. 2 also illustrates a certificate authority certificate 48 which issued the certificate 40, and the arrows point out relationships between the data recorded on the certificates 40, 48, which are exploited by the present invention to compress data, as discussed below.

During a transaction, SET certificates are verified through a hierarchy of trust. Each certificate is linked to the certificate which issued or digitally signed it. By going up the hierarchy to a known trusted party, a party can be assured that a certificate is valid, for example, a merchant can be assured that a credit card certificate provided by a customer is valid. A SET transaction thus requires an entire certificate chain, and while an end entity certificate is the only one that contains consumer specific information, the consumer needs to have not only her unique end entity certificate, but all of the parent certificates form the hierarchy. All of these certificates are provided to the merchant in order to carry out a transaction.

Figure 3:
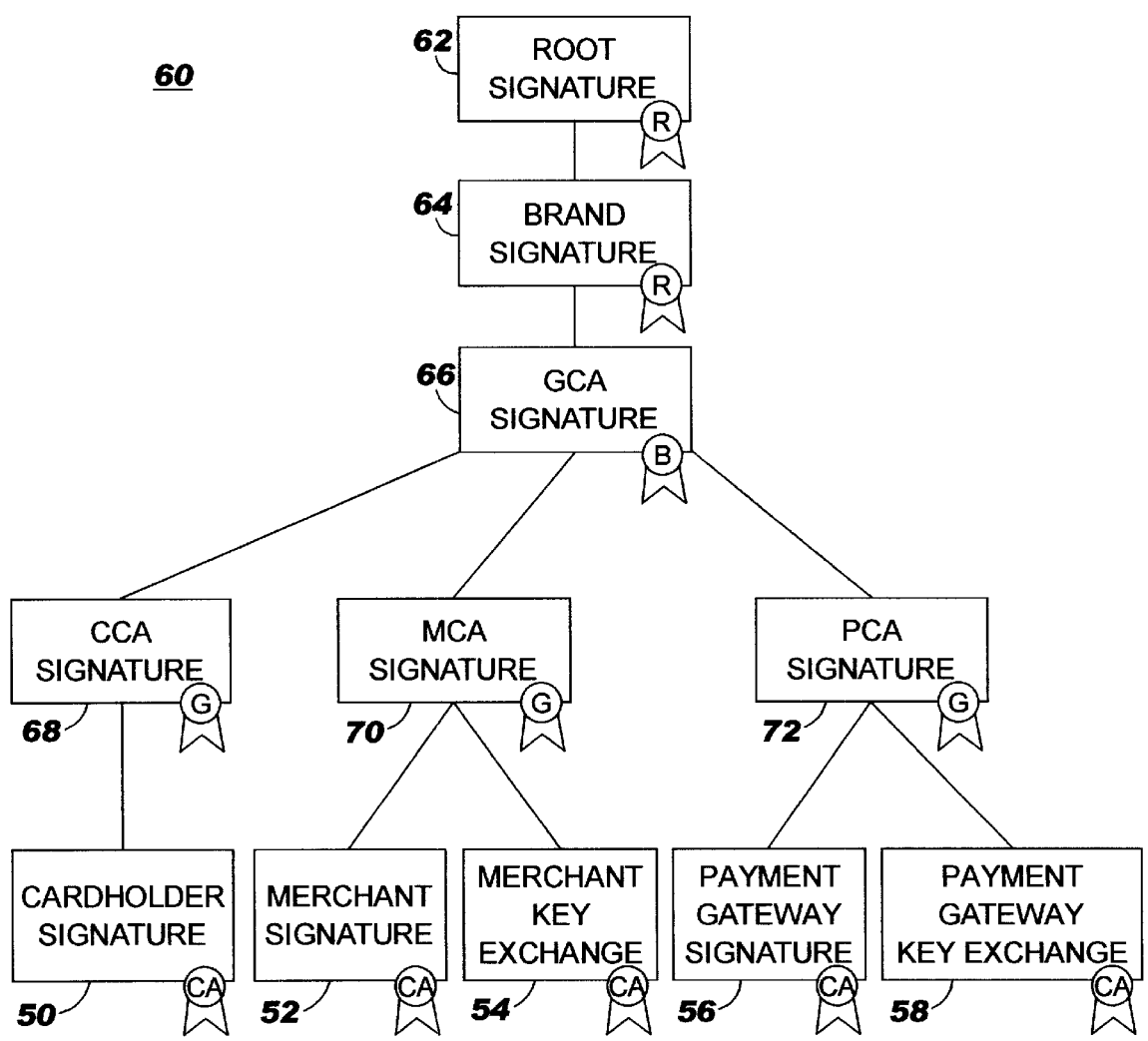
FIG. 3 illustrates a ET certificate hierarchy.

As illustrated in FIG. 3, end entity certificates 50, 52, 54, 56, 58, such as the certificate 40 of FIG. 2, are part of an overall certificate hierarchy 60. End entity certificates are at the end of the hierarchical chain, and they do not issue certificates (and thus are not "certificate authorities"). Rather, they are issued by the certificate immediately above them in the hierarchy. Certificates which have the ability to issue certificates are also known as certificate authorities. At the top of the hierarchy is a root certificate 62, which is the originating or parent certificate for all of the certificates in the hierarchy 60. Next in the hierarchy is a brand certificate 64, which is issued by the root certificate 60. In the case of credit cards, the brand certificate 64 can be, for example, VISA or MasterCard. These certificates belong to the companies that own these brands. The brand certificate 64 may issue a geopolitical certificate 66, which is optional. A geopolitical certificate may be required in certain countries, and include national rules/country specific information. The brand certificate 64 (or the optional geopolitical certificate 66) is used by the credit card issuer to issue certificates 68, 70, 72 to their agents, such as banks, which issue end user certificates to consumers and merchants. The credit card certificate 68 is used to issue credit card certificates for use by consumers, the merchant certificate 70 to issue certificates to be used by merchants to process credit card certificates received from consumers during transactions, and the payment certificate 72 is used to issue certificates to be used in conjunction with payment gateways, which process transactions.

As discussed, the certificate 68 issues credit card certificates, such as the end entity certificate 50. A consumer to whom the certificate 50 is issued is actually required to have the entire certificate chain in order to carry out a transaction with a merchant, in accordance with the SET protocol for certificate authentication. Thus, a consumer's smart card must have all four or five certificates in the chain (certificates 50, 68, 66, 64, 62) included on her smart card, depending on whether or not the geopolitical certificate is required.

As illustrated in FIG. 2, much of the data contained in different certificates is the hierarchy is redundant from one certificate to another certificate in the hierarchy. Also, each certificate has certain data which is standard. For example, the certificate 68 will typically include data which identifies the bank and provides bank information for routing the transaction to the bank. The brand certificate 64 includes brand information which identifies the type of credit card. These are examples of information which is repeated in each lower certificate in the chain.

Figure 4A:
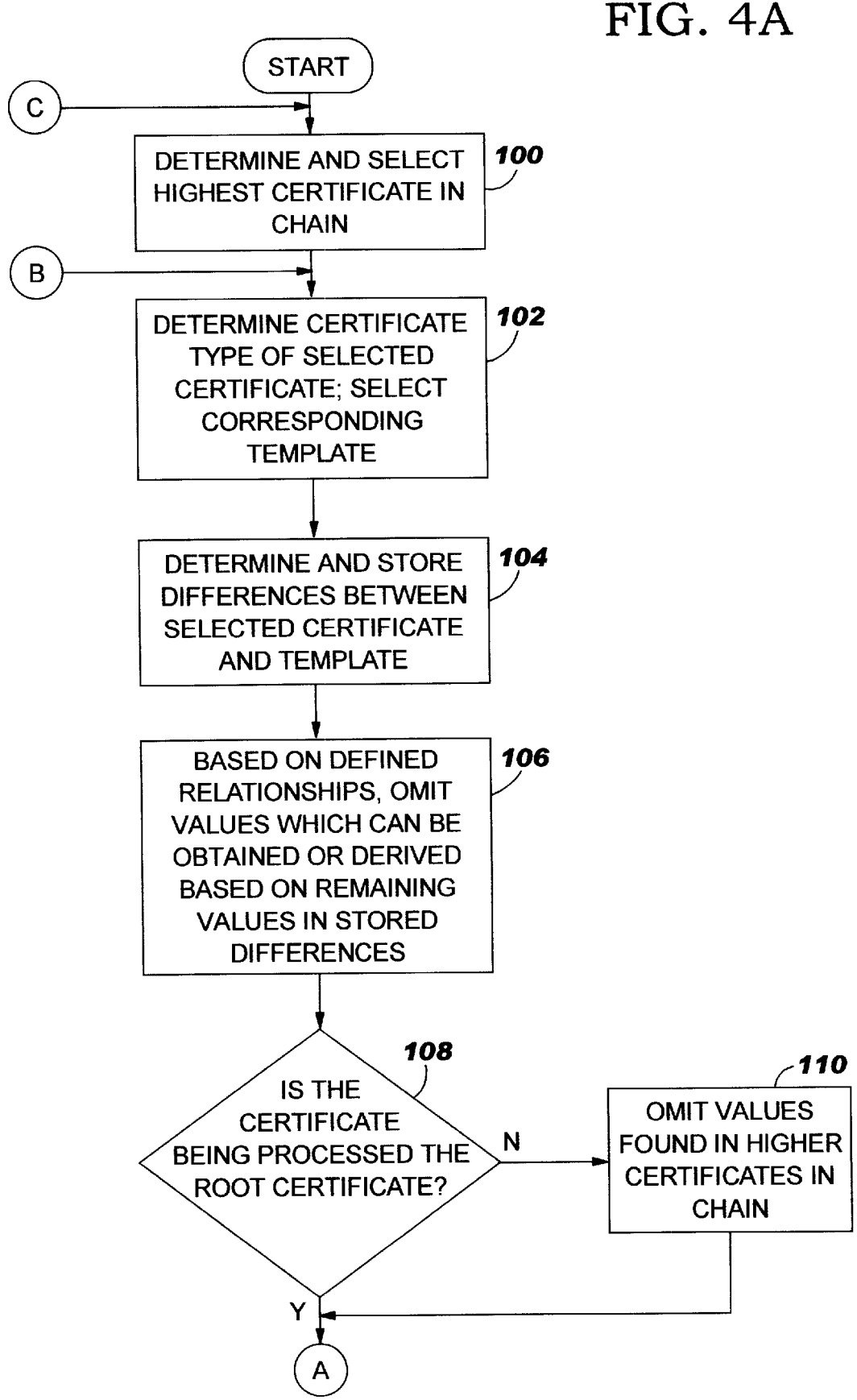
FIGS. 4A–4B illustrate a flow chart which sets forth the logic involved with the present invention.
Figure 4B:
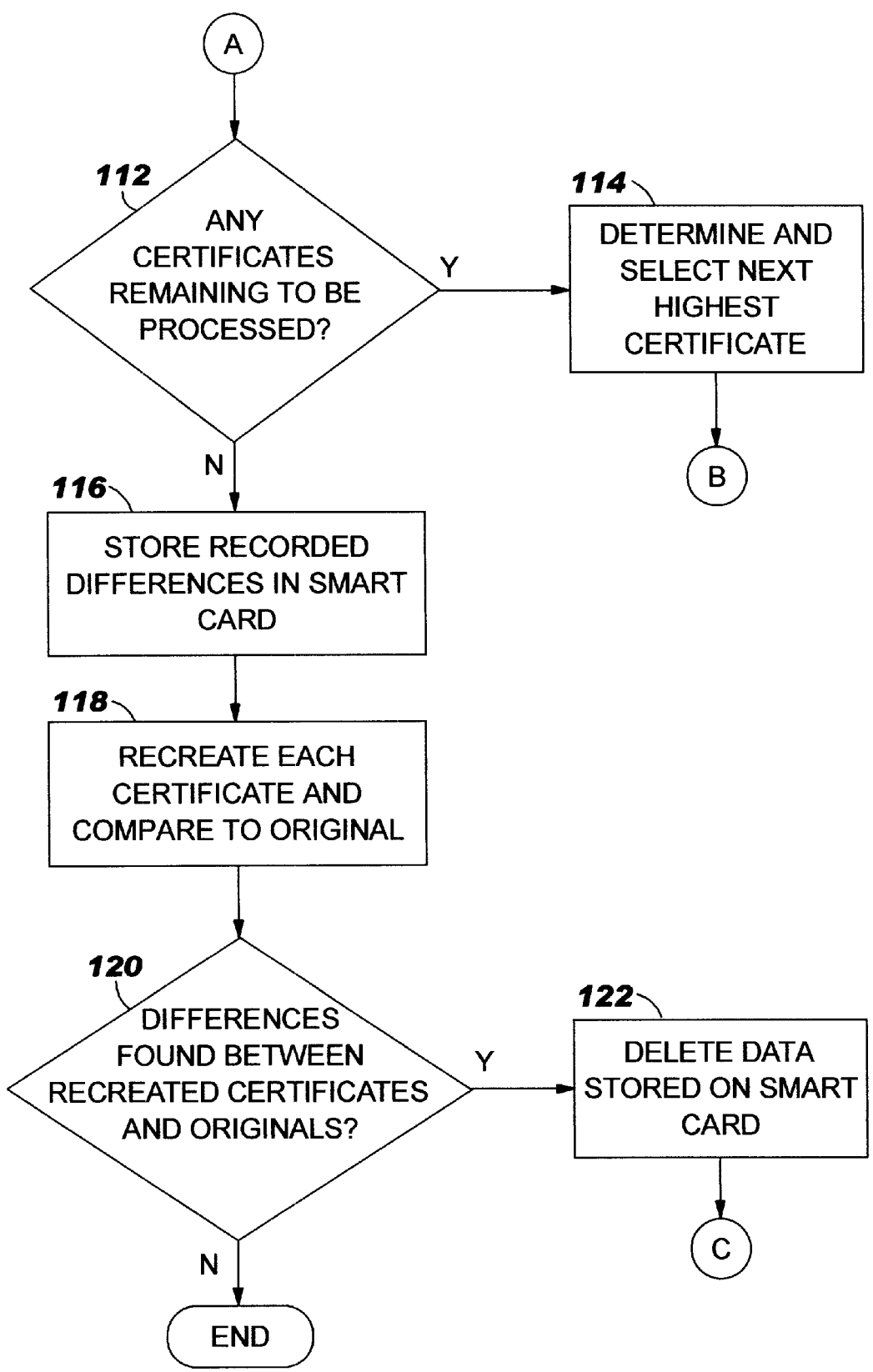

The logic involved with compressing and storing a certificate chain on a smart card will now be described with reference to the flow chart of FIG. 4.

As per Step 100, a determination is first made as to which certificate in the certificate chain to be loaded into the memory of the smart card is the highest level or root certificate (the certificate with no higher level or parent certificate that needs to be loaded). Ordinarily, this certificate will be the root certificate 62 of the hierarchy chain, which is a subset of the hierarchy 60. In this example, the root certificate 62 is selected for processing.

After a determination is made in Step 100 as to which certificate is the highest certificate in the hierarchy to be loaded onto the smart card and that certificate is selected, the certificate type for the selected certificate is determined in Step 102. The SET protocol defines each certificate in the SET hierarchy. Thus, a "blank" or template exists for each certificate in the hierarchy. As discussed, each certificate includes certificate type information in its private extensions. By reading this information, the certificate type may be determined, and the certificate matched to its template. Accordingly, the certificate type for the selected certificate is determined and the template for the certificate type is selected for use in further processing according to the present invention is Step 102.

As discussed above and illustrated in FIG. 2, each SET certificate type has a template to which data is added by the issuer. Thus, much of the data contained in an issued certificate is redundant to its template. In Step 104, the differences between the template for the selected certificate and the selected certificate itself are determined and recorded in a storage device associated with a system for storing data on individual smart cards.

As discussed, a certificate chain must be recreated in its entirety when an end user, such as a consumer, uses her credit card certificate 50. By providing the templates for all the certificates in a hierarchy at the point of use, it is a relatively simple matter to reconstruct each certificate in a certificate hierarchy by reading the compressed certificate data off of a smart card and placing it into the appropriate location with the templates. However, it is not even necessary to store all of the differences between a certificate and its template in order to reconstruct the certificate. Thus, further compression can be obtained through the use of a few additional compression steps and an appropriate programmed reconstruction algorithm which is complementary to the compression process. Some of the certificate-specific data included on some SET certificates is redundant based on how the SET certificate is defined, and thus some of the differences will be redundant if stored on a smart card. Accordingly, some of the values representing the differences between a certificate and its template may be derived from other values from among the recorded differences. Thus, as per Step 106, some of the recorded values are deleted. Selecting which redundant values are to be deleted may be performed in any of a number of ways. However, the selected manner must be reflected in the certificate reconstruction algorithm which reconstructs the certificate hierarchy when a consumer attempts to use the smart card. As discussed, the entire certificate hierarchy including each certificate in the hierarchy in its entirety is required when a certificate is utilized by a consumer. Accordingly, while it is a relatively simple matter to reconstruct a certificate by placing information stored on a smart card into predefined blanks in a common template for each certificate in a hierarchy, it is more complicated when some of the information is required to be utilized more than once when reconstructing a certificate. The reconstruction algorithm must know if certain data from a smart card is to be used in more than one location in a certificate being reconstructed.

Figure 5:
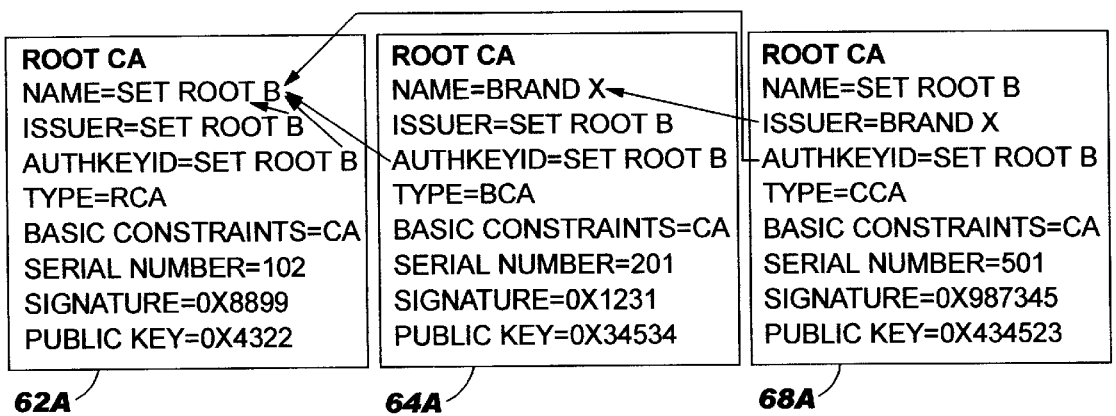
FIG. 5 illustrates data which is related between different certificates in a certificate hierarchy.

Another technique for further compressing the data that will be stored in the smart card will now be discussed relative to Steps 108 and 110. In the case of the root or highest certificate 62 in the hierarchy chain undergoing compression, there is no higher certificate being compressed. Step 108 determines whether the certificate being processed is the highest level certificate/whether the certificate being processed was issued by a certificate that has already been processed. If not, processing proceeds to Step 112. However, if the certificate being processed was issued by a previously processed/compressed certificate, processing proceeds to Step 110. In addition to there being redundant information within a given certificate, the SET definitions dictate that there is often redundant information found in different certificates within the hierarchy chain. Similarly to the process described above relative to Step 106, this redundant information need only be stored once in the smart card (as long as the data in the smart card can be appropriately reconstructed to recreate the entire hierarchy). Thus, certain information may be deleted relative to the certificate being processed. FIG. 5 illustrates this an example of this redundancy. Elements 62A, 64A, 68A illustrate a subset of the data found in certificates 62, 64, 68, respectively. The arrows indicate where common data is found in different areas of the certificates. For example, the "Name" information from the root certificate 62 is also the "Issuer" and "AuthKeyID" information in the root certificate 62, the "Issuer" and "AuthKeyID" information in the brand certificate 64 and the "AuthKeyID" information in the cardholder issuing certificate 68. Thus, in Step 108, information from the recorded differences which has already been recorded relative to a previously processed certificate is identified and deleted. Once again, the reconstruction algorithm is appropriately programmed to find this information in the smart card and place it in all of the necessary locations in the various certificates it recreates upon use of the smart card.

If the certificate was found to be the highest issuing certificate in Step 108 or after the processing of Step 110, processing proceeds to Step 112. In Step 112, it is determined if any certificates remain to be processed. In the case of the root certificate 62, the brand certificate 64, the geopolitical certificate 66 and the cardholder issuing certificate 68, the determination will be that not all of the certificates have been processed. Processing will then proceed to Step 114, and the next lower certificate in the chain will be identified and selected, and processing will return to Step 102 for processing of the newly selected certificate. For the root certificate 62, the certificate 64 will be selected in Step 114 for processing. When the end-user certificate 50 is finally selected and processed, Step 112 will determine that no lower certificates remain to be processed, and processing will proceed to Step 116.

The data which is recorded should now be a subset of the differences between the various certificate templates and the issued certificates in the certificate hierarchy chain. The data is recorded so that a reconstruction algorithm can reconstruct all the certificates in the hierarchy chain. Preferably, the data is recorded with the differences from the highest certificate in the chain recorded first, and data from each subsequent lower certificate recorded sequentially. Not all of the differences will be present, as some of the data will be redundant. Thus, the reconstruction algorithm, which is programmed with or has access to the templates, is able to read the differences subset and reconstruct each certificate in the hierarchy. Typically, the reconstruction algorithm will be stored at the location (in the equipment) at which the end user uses her certificate, such as an ATM machine, a merchant's smart card reader equipment, etc. Accordingly, as per Step 116, the recorded data is stored on the end user's smart card (in accordance with known smart card data recording/encoding techniques). Next, in accordance with the preferred embodiment, the smart card is tested for quality control purposes. In Step 118, an attempt is made to recreate the certificate chain from the data stored on the smart card using the reconstruction algorithm. Thus each certificate in the recreated certificate hierarchy is then compared to the original to determine if the compression attempt has been successful. If it is determined in Step 120 that the original certificates match the recreated certificates, then processing ends, and the compression and creation of the smart card is deemed to have been successful. The smart card is then ready for distribution to an end user. However, if it is determined in Step 120 that data in any of the recreated certificates does not match that in the originals, processing proceeds to Step 122, in which the compressed certificate data that was stored on the smart card is erased. Processing then returns to Step 100, and a new attempt is made to compress and store the certificate data on the smart card. Continued failures to get a match in Step 120 could indicate a defective smart card, or a software error in the software for the reconstruction algorithm or the compression software, or an error in the original certificate data itself.

An optional additional step may be employed before Step 116. The optional step further compresses the certificate information by employing PER encoding, which provides a very compacted encoding. PER encoding cannot be used for the actual certificates, but can be employed as an intermediate storage, as long as the encoded pieces are re-encoded into DER.

While the present invention has been described relative to smart cards, the basic techniques described herein may be applicable to many types of portable credit instruments which require or utilize digital certificates. Thus, while the preferred embodiment of the present invention has been described, additional variations and modifications in that embodiment may occur to those skilled in the art once they learn of the basic inventive concepts. Therefore, it is intended that the appended claim shall be construed to include both the preferred embodiment and all such variations and such modifications as fall within the spirit and scope of the invention.

What is claimed is:

1. Computer readable code stored on computer readable medium for compressing certificate data from a certificate chain, comprising:

first subprocesses for selecting a first certificate in the certificate chain for processing;

second subprocesses for determining a certificate template which corresponds to the selected certificate;

third subprocesses for determining and storing the differences between the selected certificate and the template;

fourth subprocesses for repeating said first, second and third subprocesses for the remaining certificates in the certificate chain; and fifth subprocesses for storing the differences in an end user credit instrument.

2. Computer readable code stored on computer readable medium for compressing certificate data according to claim 1, wherein the end user credit instrument is a smart card.

3. An end user credit instrument stored on computer readable medium having a certificate chain stored therein created by said computer readable code according to claim 1.

4. Computer readable code stored on computer readable medium for compressing certificate data according to claim 1, further comprising:

sixth subprocesses, carried out after said third subprocesses, for deleting differences which can be derived from other stored differences.

5. Computer readable code stored on computer readable medium for compressing certificate data according to claim 1, further comprising sixth subprocesses for recreating the certificate chain and comparing the recreated certificate chain to the original certificate chain, and if any differences are found, indicating an error.

6. Computer readable code stored on computer readable medium for compressing certificate data according to claim 1, further comprising:

sixth subprocesses, carried out for each certificate after said third subprocesses, for determining whether any of the stored differences can be derived from other stored differences, and if so, deleting the stored differences; and seventh subprocesses, carried out for each certificate after said sixth subprocesses, for deleting differences which can be derived from other certificate differences already stored for other certificates in the certificate chain.

7. A system for compressing certificate data for reducing storage requirements for a certificate chain, comprising:

means for determining differences between each certificate in the certificate chain and a corresponding certificate template;

means for storing the differences;

means, relative to each certificate, for determining which differences may be derived from other differences stored for each certificate and deleting the differences;

means for storing the remaining differences on a credit instrument.

8. A system for accessing data according to claim 7, further comprising means for employing PER encoding when storing the remaining differences on the credit instrument.

9. A method for compressing a digital certificate and storing the compressed chain on a credit instrument, comprising the steps of:

determining differences between each individual certificate which comprises the digital certificate and a template for each of the individual certificates;

storing the differences;

for each of the individual certificates, determining which differences are redundant and deleting the redundant differences; and recording remaining differences on a credit instrument.

10. A method according to claim 9, further comprising the step of:

after said determining step, deleting other differences which may be derived from differences stored for other certificates.

* * * * *